US005530239A

United States Patent [19]
Konishi et al.

[11] Patent Number: 5,530,239
[45] Date of Patent: Jun. 25, 1996

[54] DOCUMENT READING APPARATUS EMPLOYING TWO SUBSEQUENT SAMPLINGS OF THE LIGHT SOURCE TO INSURE STABILITY OF THE LIGHT INTENSITY LEVEL BEFORE SCANNING OCCURS

[75] Inventors: Shinichi Konishi, Hirakata; Takashi Yumiba; Motoyuki Fujino, both of Osaka, all of Japan

[73] Assignee: Matsushita Electric Industrial Co., Ltd., Kadoma, Japan

[21] Appl. No.: 322,595

[22] Filed: Oct. 13, 1994

[51] Int. Cl.⁶ ............................................ H01L 27/00
[52] U.S. Cl. ...................... 250/208.1; 250/205; 358/475; 358/509
[58] Field of Search ................... 250/208.1, 216, 250/205; 358/493, 494, 474, 486, 448, 455, 461, 475, 509, 406

[56] References Cited

U.S. PATENT DOCUMENTS

| | | | |
|---|---|---|---|
| 4,647,981 | 3/1987 | Froelich | 250/208.1 |
| 4,654,723 | 3/1987 | Nagano | 250/208.1 |
| 4,698,669 | 10/1987 | Sekizawa et al. | 358/76 |
| 4,952,972 | 8/1990 | Someya | 358/475 |
| 5,146,351 | 9/1992 | Maehara | 358/448 |
| 5,206,501 | 4/1993 | Sakakibara et al. | 250/208.1 |
| 5,214,518 | 5/1993 | Kato | 358/474 |
| 5,231,513 | 7/1993 | Yokobori et al. | 358/494 |
| 5,296,944 | 3/1994 | Suzuki et al. | 358/509 |
| 5,402,252 | 3/1995 | Kojima | 358/486 |

FOREIGN PATENT DOCUMENTS

| | | |
|---|---|---|
| 62-195976 | 8/1987 | Japan . |
| 62-195980 | 8/1987 | Japan . |
| 1165264 | 6/1989 | Japan . |

*Primary Examiner*—Edward P. Westin
*Assistant Examiner*—Steven L. Nichols
*Attorney, Agent, or Firm*—Renner, Otto, Boisselle & Sklar

[57] ABSTRACT

A document reading apparatus includes a reference member used for determining the reference gray scale of an image on a document; a fluorescent lamp for illuminating the reference member; an image sensor for receiving light from the fluorescent lamp via the reference member and for converting the received light into an electric signal; a circuit for obtaining the difference between the latest data corresponding to a specified pixel among the output of the image sensor and the data before a predetermined period corresponding to the specified pixel among the output of the image sensor; and a circuit for determining whether or not the read operation of the document should be started by comparing the difference and a predetermined value.

6 Claims, 11 Drawing Sheets

DOCUMENT READING APPARATUS EMPLOYING TWO SUBSEQUENT SAMPLINGS OF THE LIGHT SOURCE TO INSURE STABILITY OF THE LIGHT INTENSITY LEVEL BEFORE SCANNING OCCURS

BACKGROUND OF THE INVENTION

1. Field of the Invention

The present invention relates to a document reading apparatus for reading an image on a document in which the document is illuminated with light from a fluorescent lamp and the light reflected from the document is converted into an electrical signal by a solid-state imaging device such as a CCD (charge coupled device) sensor.

2. Description of the Related Art

In recent years, a smaller and less expensive document reading apparatus with higher quality is required.

FIG. 12 shows a configuration of a conventional document reading apparatus. The document reading apparatus which is disclosed in Japanese Laid-Open Patent Publication No. 62-195976 includes an object 53 placed on a document plate 52 for determining a reference gray scale of an image.

When a CPU 60 receives a specific command, the CPU 60 supplies a light-up signal to a fluorescent lamp lighting circuit 63 so as to light up a fluorescent lamp 51. The fluorescent lamp 51 then illuminates the object 53. Light reflected from the object 53 is converged on an image sensor 56 by a Selfac lens 55. The image sensor 56 converts the received light into an electrical signal. The output of the image sensor 56 is compared with a predetermined reference value by a comparator 58. The reference value is supplied to the comparator 58 by a reference source 59.

When the output of the image sensor 56 is smaller than the reference value, the comparator 58 outputs a HIGH signal to the CPU 60. On receipt of the HIGH signal, the CPU 60 controls a heater source 62 so as to switch on a heater 61 and thus raise the temperature of the tube wall of the fluorescent lamp 51. Thereafter, when the output of the image sensor 56 becomes greater than the reference value, the comparator 58 outputs a LOW signal to the CPU 60. On receipt of the LOW signal, the CPU 60 controls the heater source 62 so as to switch off the heater 61, and controls a motor driving circuit 64 so as to drive a motor 57. When the motor 57 starts driving, the read operation of a document 54 that is placed on the document plate 52 is started.

Alternatively, when the output of the image sensor 56 is smaller than the reference value, the CPU 60 may control the heater source 62 so that the heater 61 be kept switched on for a predetermined period. In this case, the read operation of the document 54 is started after the lapse of the predetermined period.

When the output from the image sensor 56 is greater than the reference value, the comparator 58 outputs a LOW signal to the CPU 60. On receipt of the LOW signal, the CPU 60 allows the motor 57 to start driving without switching on the heater 61, so as to start the read operation of the document 54.

As described above, the conventional document reading apparatus determines whether or not the read operation of the document should be started by comparing the output of the image sensor with a predetermined reference value. According to such a conventional document reading apparatus, the read operation of the document will not be started when the output of the image sensor does not reach the reference value due to a decrease in the amount of light emitted by the fluorescent lamp caused by changes over the years. To avoid this trouble, the reference value needs to be set to a lower level so as to compensate for this change over the years. In the latter case, however, the conventional document reading apparatus will start the read operation of the document even when the temperature of the tube wall of the fluorescent lamp is lower than the level required. As a result, the amount of light from the fluorescent lamp during the read operation of the document varies. This deteriorates the quality of the resultant image.

The conventional document reading apparatus has another disadvantage of being influenced by environmental changes. Especially, when the conventional document reading apparatus is placed under a low temperature condition, the temperature of the tube wall of the fluorescent lamp will not rise sufficiently even when the fluorescent lamp is heated by the heater. In this case, since the output of the image sensor will not reach the reference value, the conventional document reading apparatus cannot start the read operation of the document.

SUMMARY OF THE INVENTION

The document reading apparatus of this invention, includes a reference member used for determining the reference gray scale of an image on a document; a fluorescent lamp for illuminating the reference member; an image sensor for receiving light from the fluorescent lamp via the reference member and for converting the received light into an electric signal; a circuit for obtaining the difference between the latest data corresponding to a specified pixel among the output of the image sensor and the data before a predetermined period corresponding to the specified pixel among the output of the image sensor; and a circuit for determining whether or not the read operation of the document should be started by comparing the difference and a predetermined value.

In another aspect of the present invention, a document reading apparatus includes a reference member used for determining the reference gray scale of an image on an document; a fluorescent lamp for illuminating the reference member; a color image sensor for receiving light from the fluorescent lamp via the reference member and separating the received light into a first component, a second component, and a third component so as to output a first signal, a second signal, and a third signal corresponding to the first component, the second component, and the third component, respectively; a circuit for obtaining the difference between data corresponding to one of the first signal, the second signal, and the third signal and data corresponding to another one of the first signal, the second signal, and the third signal; and a circuit for determining whether or not the read operation of the document should be started by comparing the difference and a predetermined value.

Thus, the invention described herein makes possible the advantage of providing a document reading apparatus with a simple and inexpensive structure which is less influenced by a decrease in the amount of light emitted by a fluorescent lamp caused by changes over the years, or a change in the temperature caused by an environmental change.

This and other advantages of the present invention will become apparent to those skilled in the art upon read and understanding the following detailed description with reference to the accompanying figures.

DESCRIPTION OF THE PREFERRED EMBODIMENTS

First, the principle of the present invention will be described. Hereinafter, it is assumed that light from a fluorescent lamp is incident to an image sensor via a reference member for determining the reference gray scale of an image.

Figure 1:
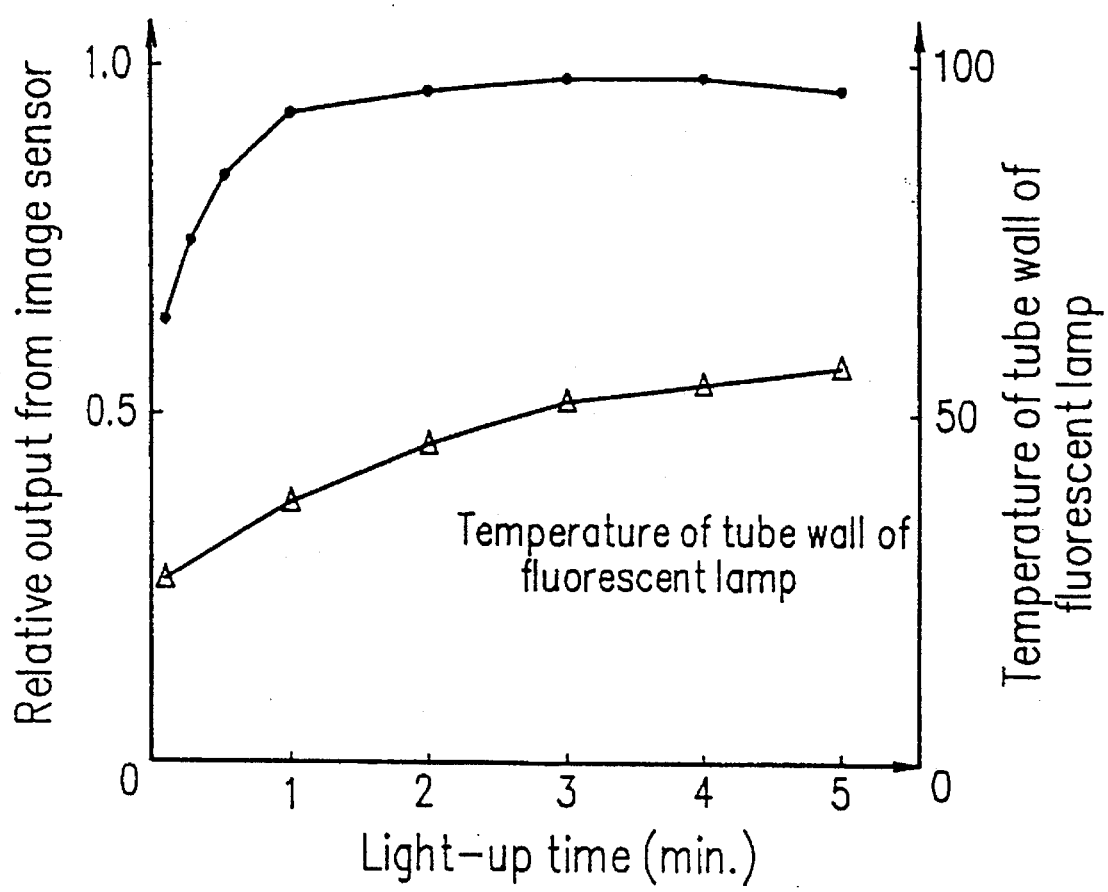
FIG. 1 is a graph showing the relationship between the light-up time of a fluorescent lamp, the output of the image sensor in response to light from a reference member and the temperature of the tube wall of the fluorescent lamp at a normal temperature.

FIG. 1 shows the relationship between the light-up time of the fluorescent lamp, the output of the image sensor in response to light from the reference member and the temperature of the tube wall of the fluorescent lamp at a normal temperature. The Y axis represents a relative output of the image sensor having 1 as the maximum. As is observed from FIG. 1, the relative output of the image sensor sharply increases in the beginning of the light-up time of the fluorescent lamp and thereafter becomes substantially stable. This is due to the close relationship between the amount of light from the fluorescent lamp and the temperature of the tube wall of the fluorescent lamp.

Figure 2:
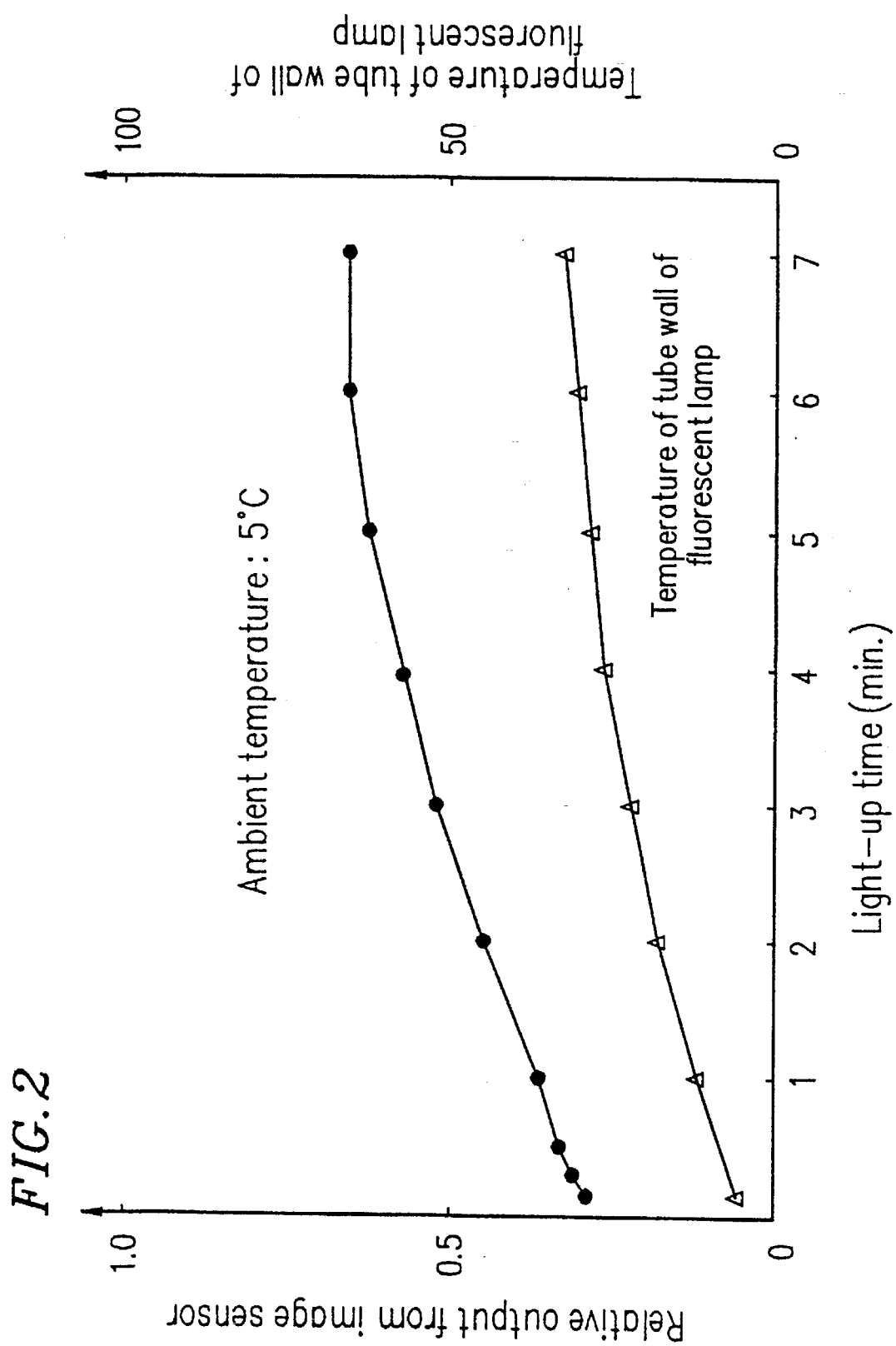
FIG. 2 is a graph showing the same relationship as FIG. 1 when the ambient temperature is 5° C.

FIG. 2 shows the relationship between the image sensor in response to light from the reference member and the temperature of the tube wall of the fluorescent lamp in the case where the ambient temperature is 5° C.

Figure 3:
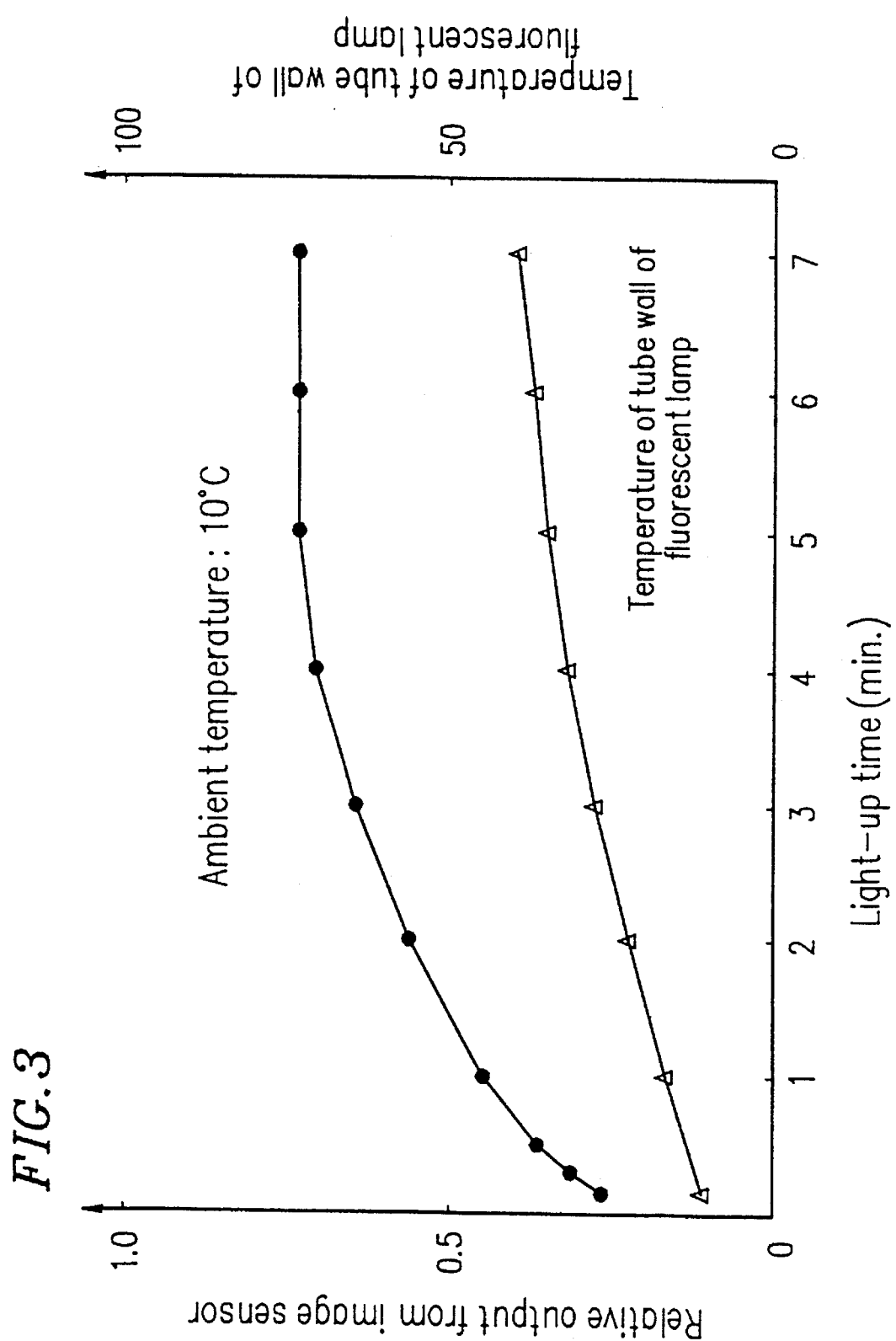
FIG. 3 is a graph showing the same relationship as FIG. 1 when the ambient temperature is 10° C.

FIG. 3 shows the relationship between the image sensor in response to light from the reference member and the temperature of the tube wall of the fluorescent lamp in the case where the ambient temperature is 10° C.

As is seen from FIGS. 1, 2 and 3, the relationships have substantially the same characteristics regarding the changing ratio of output of the image sensor irrelevant of the ambient temperature, although absolute value of the output of the image sensor becomes low as the ambient temperature becomes low.

Figure 4:
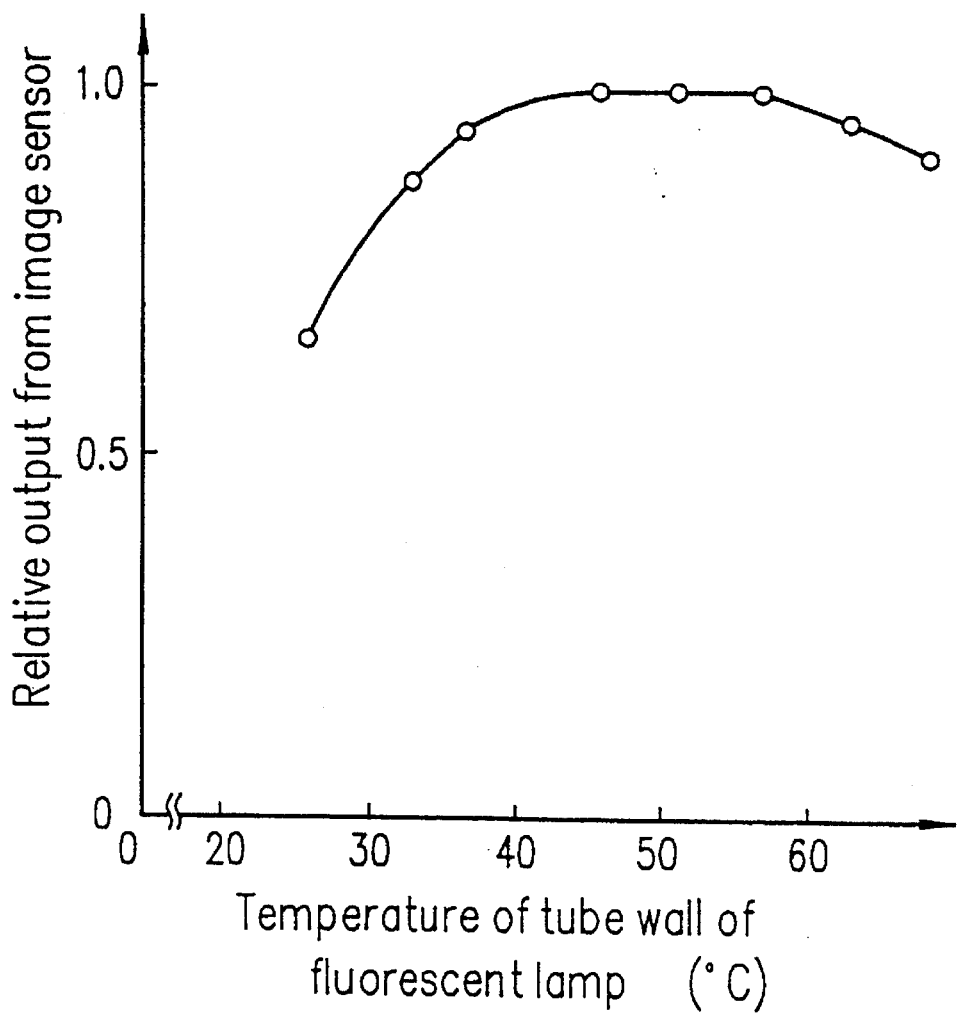
FIG. 4 is a graph showing the relationship between the relative output of the image sensor and the temperature of the tube wall of the fluorescent lamp.

FIG. 4 is a graph having the relative output of the image sensor given in FIG. 1 as the Y axis and the temperature of the tube wall of the fluorescent lamp given in FIG. 1 as the X axis. As is observed from FIG. 4, the relative output from the image sensor sharply increases until the temperature of the tube wall of the fluorescent lamp reaches near 40° C., and then moderately decreases after the temperature exceeds near 40° C. This is because the amount of light from the fluorescent lamp changes depending on the temperature of the tube wall of the fluorescent lamp. This means that, in the case where the read operation of the document is started from an early stage when the temperature of the tube wall of the fluorescent lamp is still low, the amount of light from the fluorescent lamp continues to increase during the read operation of the document. As a result, the output of the image sensor varies from the beginning to the end of the read operation even when images with the same gray scale are read.

Figure 5:
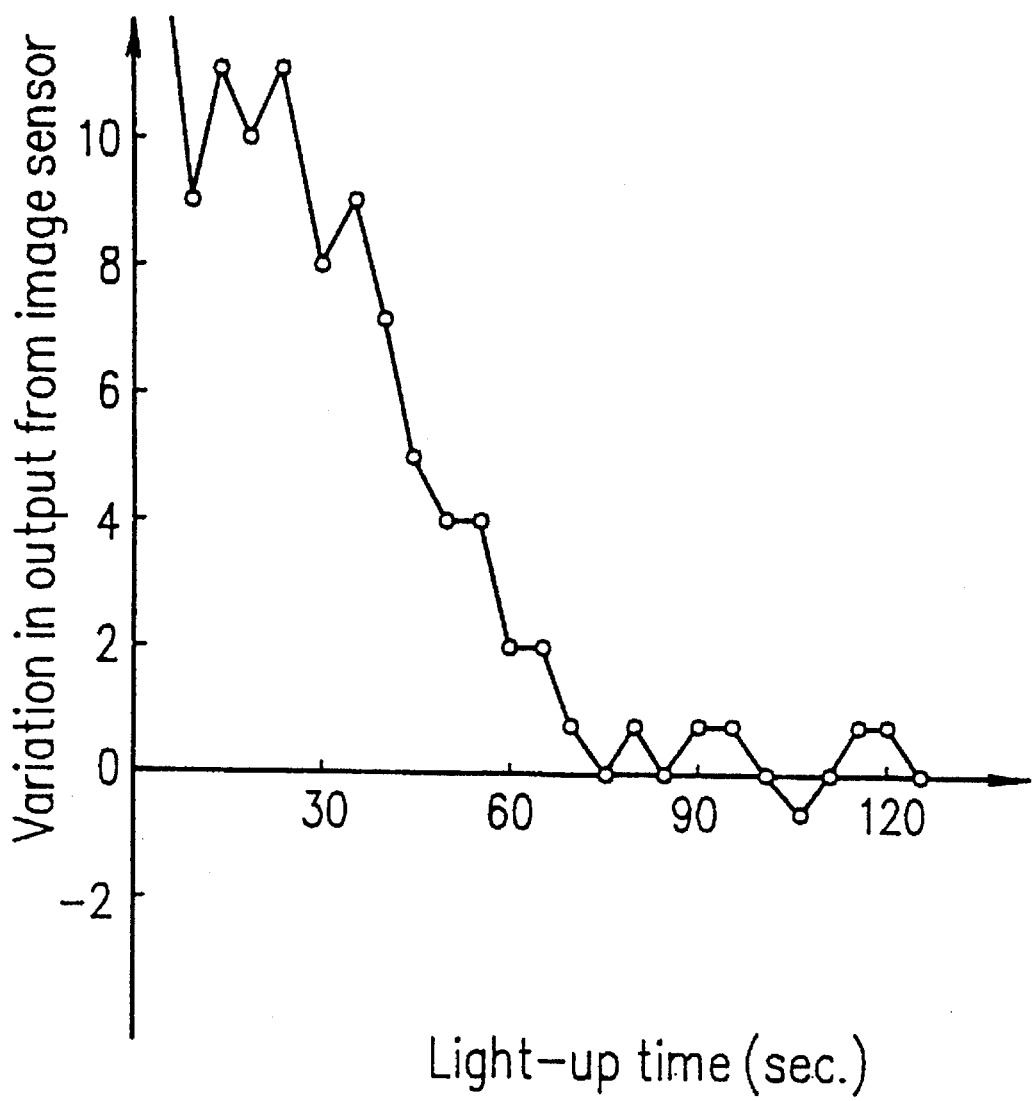
FIG. 5 is a graph showing the relationship between the light-up time of the fluorescent lamp, the change of data corresponding to a specified pixel among the output of the image sensor in response to light from the reference member measured every five seconds.

FIG. 5 shows the relationship between the light-up time of the fluorescent lamp and the change of the output of the image sensor corresponding to a specified pixel measured every five seconds. The variation is the difference between the latest data and the data before five seconds. In this example, it is assumed that the output of the image sensor corresponds to eight bits. In comparison with FIG. 1, it is obvious that the change of the output of the image sensor decreases as the amount of light from the fluorescent lamp becomes stable. Accordingly, by starting the read operation of the document only when the change of the output of the image sensor corresponding to a specified pixel measured every predetermined time is smaller than the reference value, substantially the same level of output of the image sensor can be obtained from the beginning to the end of the read operation of the document. As a result, images with higher quality will be obtained.

Thus, according to the present invention, whether or not the read operation of the document should be started is determined by using the change of the output of the image sensor with time as a parameter, not depending on the absolute value of the amount of light from the fluorescent lamp as in the conventional case. Accordingly, the read operation can always be started under an optimal condition even when the amount of light decreases due to changes over the years, or when the ambient temperature becomes low. The document reading apparatus of the present invention is also free from any influence of variation in the gain adjustment which may be caused by mass-production of the document reading apparatus.

Next, based on the above principle, the configuration of the document reading apparatus according to the present invention will be described by way of examples as follows.

(EXAMPLE 1)

Figure 6:
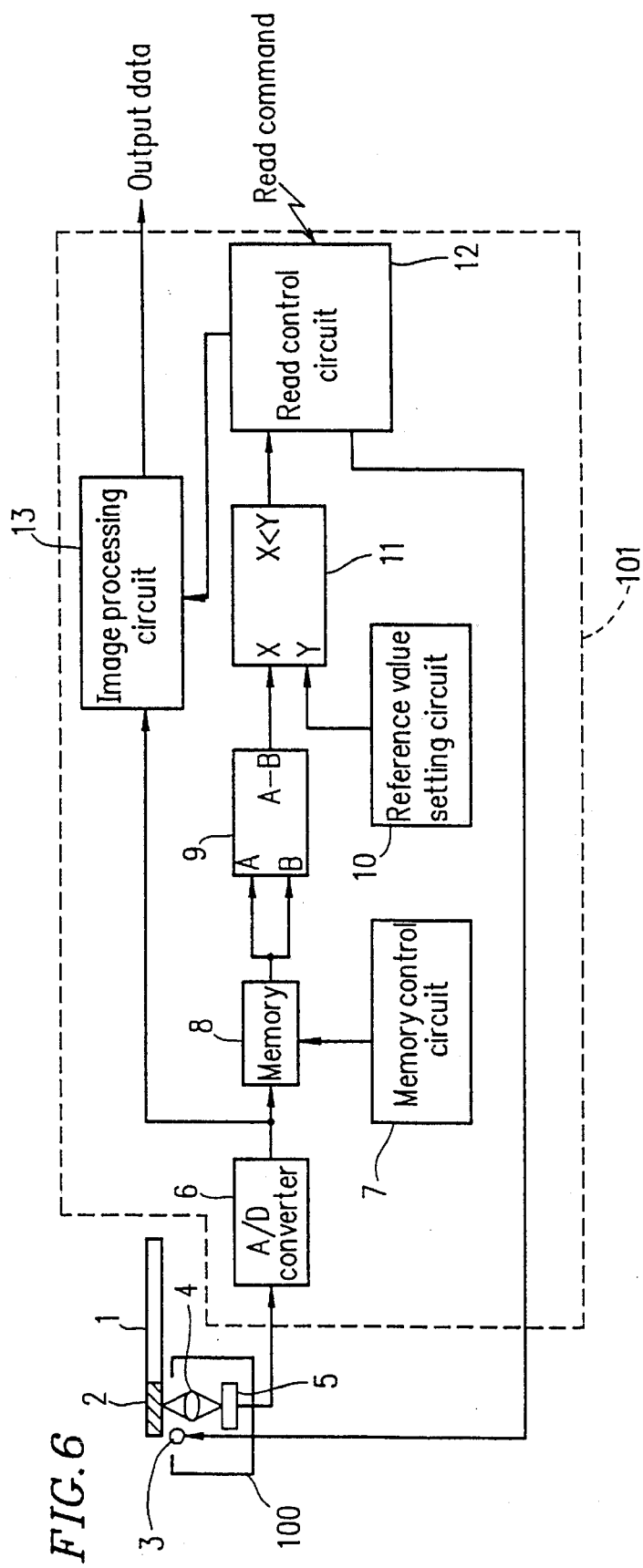
FIG. 6 is a block diagram of a first example of the document reading apparatus according to the present invention.

FIG. 6 shows the configuration of a first example of the document reading apparatus according to the present invention.

The document reading apparatus includes a document plate 1 for supporting a document, a reference member 2 used for determining the reference gray scale of images, an optical system unit 100, and a signal processing unit 101. The optical system unit 100 includes a fluorescent lamp 3, a lens 4, and an image sensor 5. The signal processing unit 101 includes an A/D converter 6, a memory control circuit 7, a memory 8, a subtracter 9, a reference value setting circuit 10, a comparator 11, a read control circuit 12, and an image processing circuit 13.

The document plate 1 is made of glass, for example. The reference member 2 may be disposed on the document plate 1 or on part of the document plate 1. In order to define the maximum level of the output of the image sensor 5 for shading correction, the reference member 2 preferably has a white surface for reflecting light from the fluorescent lamp 3. The reference member 2 is typically of a plate shape, though not restricted thereto. Accordingly, the reference member 2 is referred to as a reference plate.

On receipt of a read command from the operator, the read control circuit 12 lights up the fluorescent lamp 3 so as to illuminate the reference member 2. The light from the fluorescent lamp 3 is incident to the image sensor 5 via the reference member 2. The image sensor 5 may receive light reflected from the reference member 2 or light transmitted through the reference member 2. The lens 4 is used to ensure the reflected or transmitted light to be incident to the image sensor 5. The lens 4 is also used to ensure that light from the document placed on the document plate 1 be incident to the image sensor 5.

The image sensor 5 converts the incident light into an electrical signal. The output of the image sensor 5 is converted into a digital signal by the A/D converter 6. The memory control circuit 7 stores data corresponding to a specified pixel among the output of the image sensor 5 in the memory 8 every predetermined period (hereinafter, such a predetermined period is referred to as "one cycle"). The specified pixel may be a pixel at any selected position on a line. For example, it may be the first pixel on a line. Alternatively, a plurality of pixels may be used as specified pixels. One cycle is five seconds, for example.

The memory control circuit 7 reads the latest data and the data before one cycle from the memory 8, and inputs them to inputs A and B of the subtracter 9, respectively. The subtracter 9 subtracts the input B from the input A, and inputs the result (A−B) to an input X of the comparator 11. Into an input Y of the comparator 11 is supplied a reference value (constant) previously set by the reference value setting circuit 10. Then the output of the A/D converter 6 consists of eight bits, the reference value is previously set to 1/255, for example. The comparator 11 compares the output of the subtracter 9 with the reference value. When the output of the subtracter 9 (i.e., the difference of the outputs of the image sensor 5 during one cycle) is smaller than the reference value, the comparator 11 outputs a read signal (a HIGH signal, for example) to the read control circuit 12. On receipt of the read signal, the read control circuit 12 supplies a driving signal to a motor (not shown), and couples the output of the A/D converter 6 to the image processing circuit 13. Thus, the read operation of the document is started at a time when the output of the image sensor 5 becomes stable, allowing image data to be output by the image processing circuit 13.

When the output of the subtracter 9 is greater than the reference value, the above operation is repeated until the output of the subtracter 9 becomes smaller than the reference value.

As described above, the document reading apparatus of the first example realizes the principle of the present invention. Accordingly, the read operation can always be started under an optimal condition even when the amount of light from the fluorescent lamp decreases due to a change over the years and when the ambient temperature lowers. Also, the document reading apparatus of the first example is free from an influence of a variation in the gain adjustment which may be caused by mass-production of the document reading apparatus.

(EXAMPLE 2)

Figure 7:
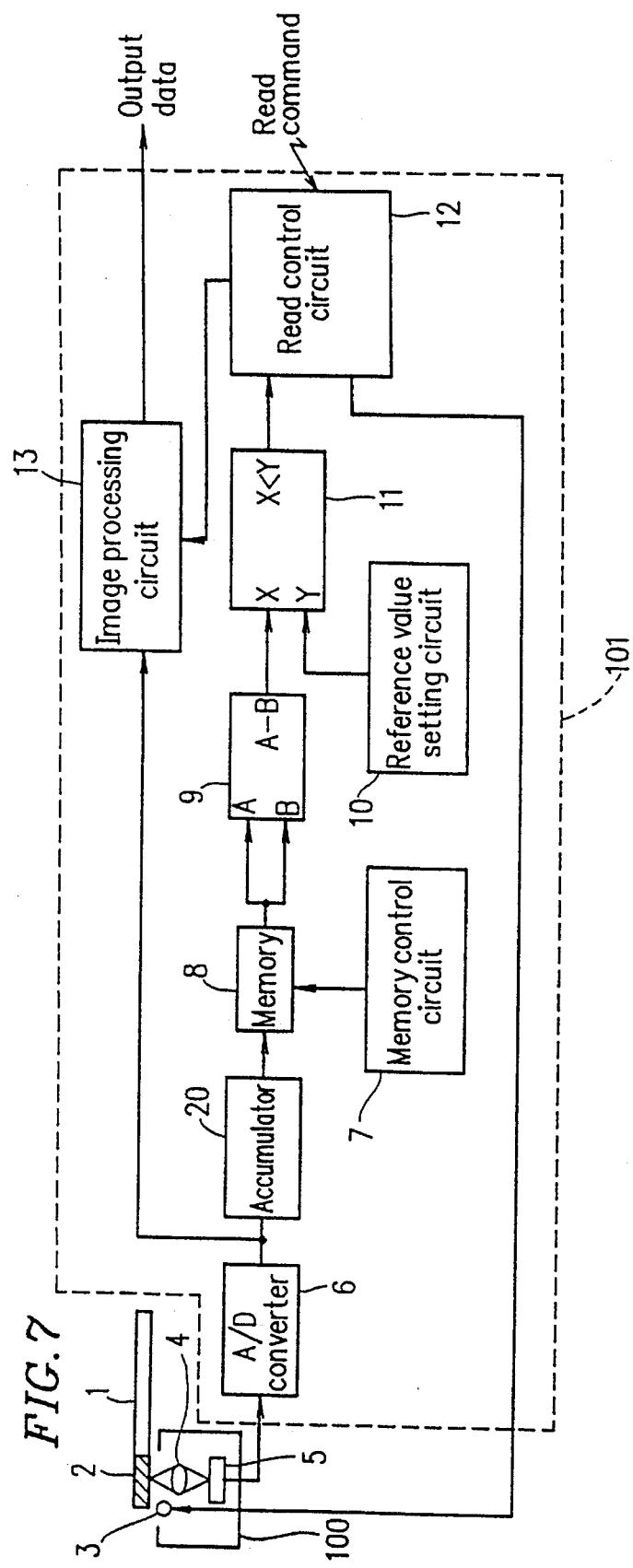
FIG. 7 is a block diagram of a second example of the document reading apparatus according to the present invention.

FIG. 7 shows the configuration of a second example of the document reading apparatus according to the present invention. In FIG. 7, the same components are denoted by the same reference numerals as those in FIG. 6, and the description thereof is omitted.

The document reading apparatus of the second example is different from that of the first example in that an accumulator 20 is disposed between the A/D converter 6 and the memory 8. The accumulator 20 accumulates data corresponding to a specified pixel among the output of the A/D converter 6 at a predetermined number of times. The specified pixel may be a pixel at any selected position on a line. For example, it may be the first pixel on a line. The accumulator 20 accumulates data corresponding to the specified pixel for N times during the period from the first main scanning time to the Nth main scanning time, and then accumulates data corresponding to the specified pixel for N times during the period from the (N+1) main scanning time to the (N+N) main scanning time. For example, when one main scanning time (line cycle) is 8 ms and the accumulation is made for two seconds, the number of times of accumulation will be 250.

The memory control circuit 7 stores accumulated data corresponding to the specified pixel among the output of the image sensor 5 in the memory 8 every one cycle. One cycle is two seconds, for example. The memory control circuit 7 reads the latest accumulated data and the accumulated data before one cycle from the memory 8, and inputs them to the inputs A and B of the subtracter 9, respectively. The subtracter 9 subtracts the input B from the input A, and inputs the result (A−B) to the input X of the comparator 11. Into the input Y of the comparator 11 is supplied a reference value (constant) previously set by the reference value setting circuit 10. When the output of the A/D converter 6 consists of eight bits, the reference value is previously set to 100/(255*250), for example. The subsequent processing is the same as that described in the first example.

The reason why the data is accumulated will now be described. In general, in a transient time when the amount of light from the fluorescent lamp varies, the output from the image sensor 5 tends to increase macroscopically while repeating increases and decreases microscopically. This is because the output of the image sensor 5 is influenced by noise and the like. For example, the output of the A/D converter 6 increases as a whole with increases and decreases by 1/255. According to the second example, noise components can be eliminated from the output of the A/D converter 6 by adopting the difference between the accumulated data. This makes it possible to detect a variation in the amount of light from the fluorescent lamp in a relatively short time.

Figure 8:
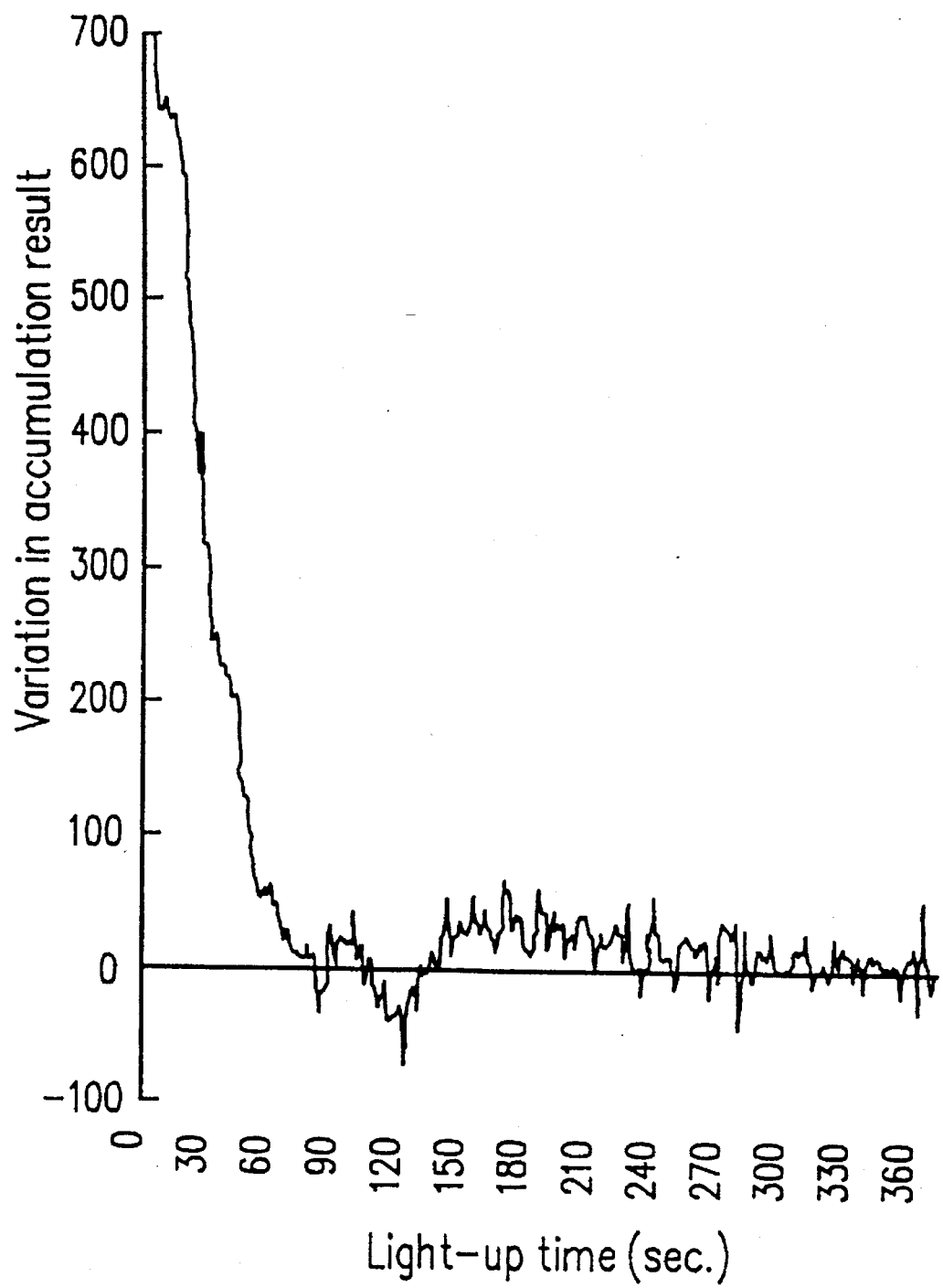
FIG. 8 is a graph showing the relationship between the light-up time of the fluorescent lamp, the change of accumulated data corresponding to a specified pixel among of the output of the image sensor in response to light from the reference member measured every two seconds.

FIG. 8 shows the relationship between the light-up time of the fluorescent lamp and the change of accumulated data corresponding to a specified pixel among the output of the image sensor in response to light from the reference member measured every two seconds.

As described above, according to the document reading apparatus of the second example, the variation in the amount of light from the fluorescent lamp can be correctly detected in a shorter time. This makes it possible to determine whether the read operation should be started or not in a shorter time. The effects as described in the first example can also be obtained.

(EXAMPLE 3)

Figure 9:
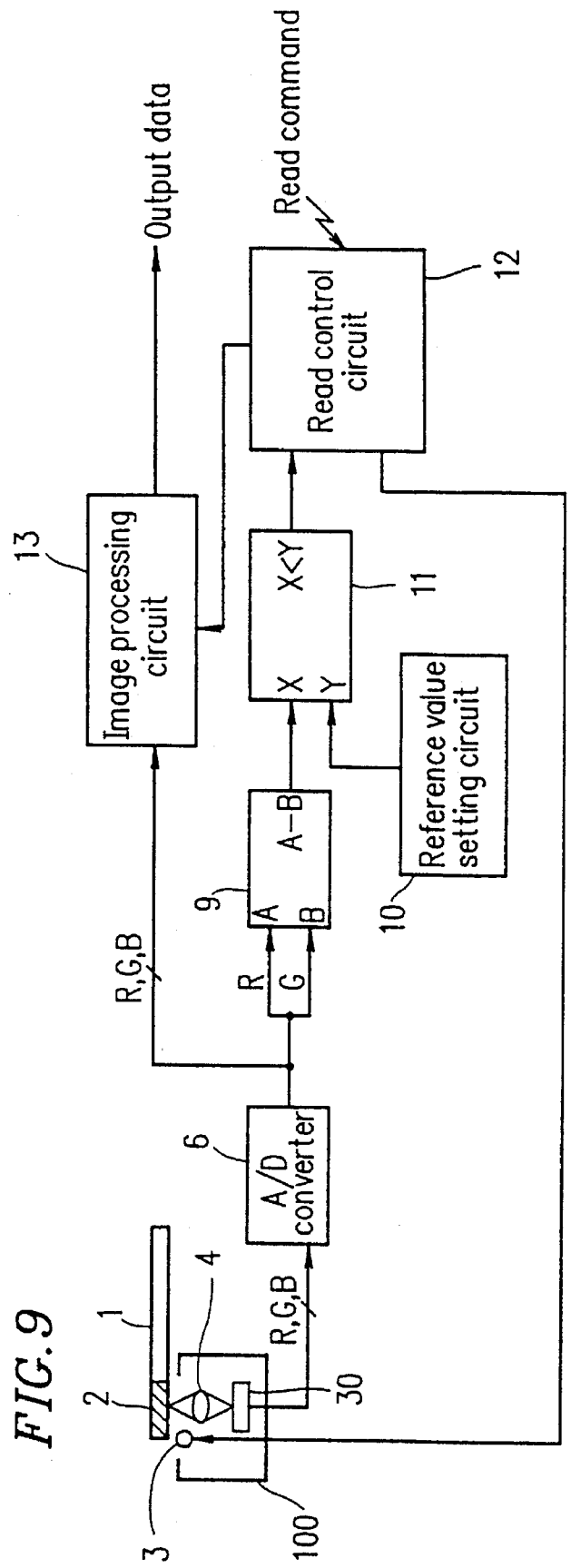
FIG. 9 is a block diagram of a third example of the document reading apparatus according to the present invention.

FIG. 9 shows the configuration of a third example of the document reading apparatus according to the present invention. In FIG. 9, the same components are denoted by the same reference numerals as those in FIG. 6, and the description thereof is omitted.

Figure 10:
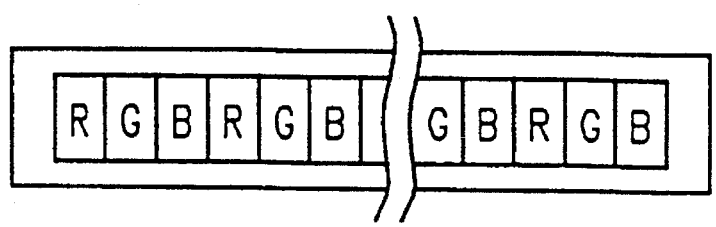
FIG. 10 shows a structure of a color image sensor.

The document reading apparatus of the third example is different from that of the first example in the following points: First, a color image sensor 30 is disposed instead of the image sensor 5, and red and green signals of the output from the color image sensor 30 are input to the inputs A and B of the subtracter 9, respectively. Second, the memory control circuit 7 and the memory 8 are omitted. As shown in FIG. 10, a color separation filter separating red (R), green (G), and blue (B) repeatedly in this order in a main scanning direction is formed on a surface of the color image sensor 30.

On receipt of a read command from the operator, the read control circuit 12 lights up the fluorescent lamp 3 so as to illuminate the reference member 2. Light from the fluorescent lamp 3 is incident to the color image sensor 30 through the reference member 2. The incident light is separated into R, G, and B components by the color separation filter disposed on the surface of the color image sensor 30. The color image sensor 30 converts the R, G, and B components of the incident light into R, G, and B signals, respectively, and outputs these signals in series.

The output of the color image sensor 30 are then converted into digital signals by the A/D converter 6. The R signal and G signal corresponding to a specified pixel among the output of the color image sensor 30 are then input to the inputs A and B of the subtracter 9, respectively. The subtract 9 subtracts the input B from the input A, and inputs the result (A–B) into the input X of the comparator 11. Into the input Y of the comparator 11 is supplied a reference value (constant) previously set by the reference value setting circuit 10. When the output of the A/D converter 6 consists of eight bits, the reference value is previously set to 5/255, for example. The subsequent processing is the same as that described in the first example.

Figure 11:
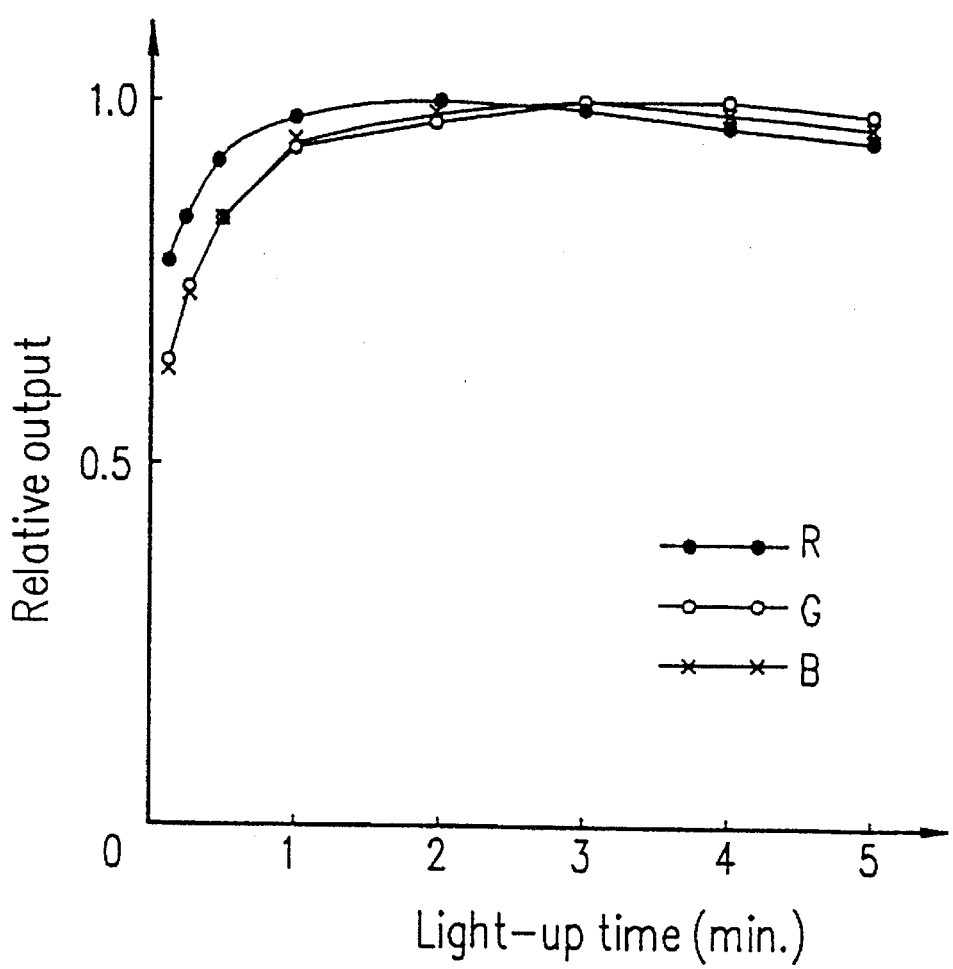
FIG. 11 is a graph showing the relationship between the light-up time of the fluorescent lamp, the R, G, and B signals corresponding to a specified pixel among the output of the color image sensor.
Figure 12:
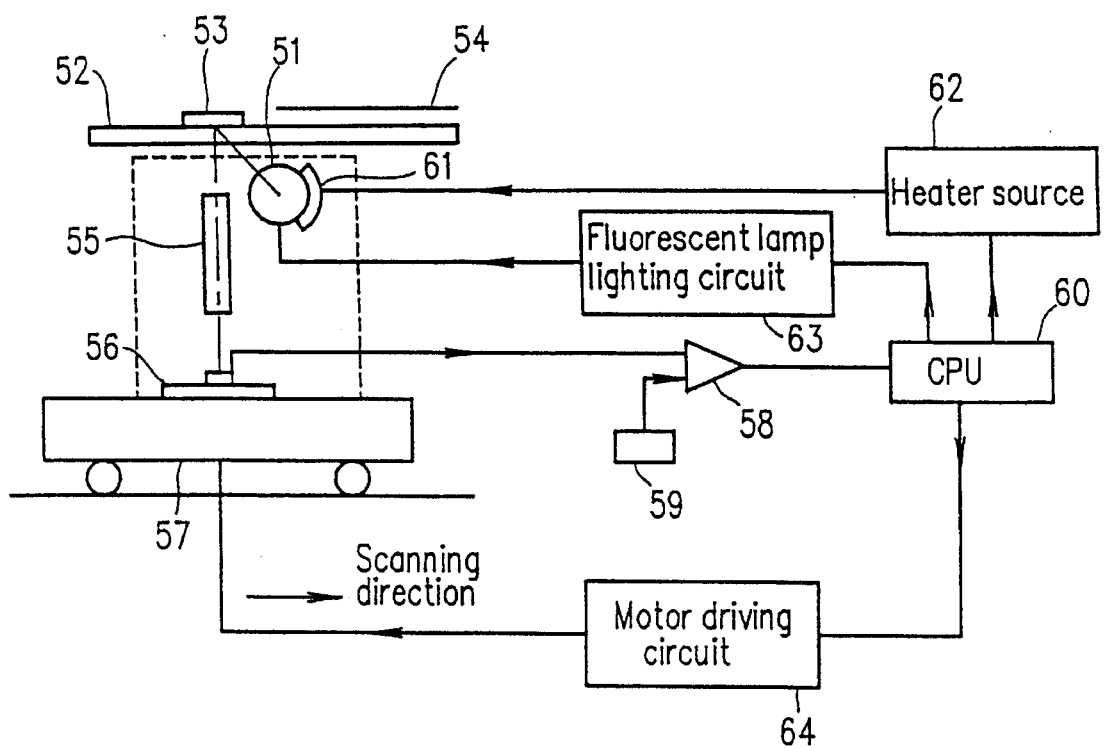
FIG. 12 is a block diagram of a conventional document reading apparatus.

FIG. 11 shows the relationship between the light-up time of the fluorescent lamp, the R, G, and B signals corresponding to a specified pixel among the output of the color image sensor at a normal temperature. The Y axis represents the relative output of the color image sensor having 1 as the maximum. As is observed from FIG. 11, with the lapse of the light-up time of the fluorescent lamp, the difference between the R signal and the G signal and the difference between the R signal and the B signal decreases. This is because the fluorescent lamp generates more infrared rays as the temperature of the tube wall of the fluorescent lamp becomes lower.

Accordingly, by starting the read operation of the document only when the difference between the R and G signals or the difference between the R and B signals is smaller than a reference value, substantially the same level of output of the color image sensor can be obtained from the beginning to the end of the read operation of the document. As a result, images with high quality will be obtained. Moreover, the read operation can always be started under an optimal condition even when the amount of light from the fluorescent lamp decreases due to a change over the years and when the ambient temperature becomes low. The document reading apparatus of the third example is also free from any influence of variation in the gain adjustment which may be caused by mass-production of the document reading apparatus.

Though light was separated into R, G, and B three components in the third example, color can also be separated into the other three components. Also, the R and B signals may be supplied to the subtracter 9, instead of the R and G signals.

As in the first and second examples, a memory and a memory control circuit for controlling the memory may be disposed in the third example, so as to obtain the difference between the latest data and the data before a predetermined period corresponding to at least one of the R, G, and B signals.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A document reading apparatus comprising:

a reference member used for determining the reference gray scale of an image on a document;

a fluorescent lamp for illuminating the reference member;

converting means for receiving light from the fluorescent lamp via the reference member and for converting the received light into an electric signal;

processing means for obtaining the difference between latest data corresponding to a specified pixel among the output of the converting means and the data before a predetermined period corresponding to specified pixel among the output of the converting means; and determination means for determining whether or not the read operation of the document should be started by comparing the difference and a predetermined value.

2. A document reading apparatus according to claim 1, further comprising accumulation means for accumulating data corresponding to the specified pixel among the output of the converting means for a plurality of times during the predetermined period, wherein the processing means obtains the difference between latest data which is accumulated by the accumulation means and data before the predetermined period which is accumulated by the accumulation means.

3. A document reading apparatus according to claim 1, wherein the processing means comprises a memory, memory control means for controlling the memory, and a subtraction means having an input A and an input B for subtracting the input B from the input A, and the memory control means stores data corresponding to the specified pixel among the output of the converting means every predetermined period, reads the latest data and the data before the predetermined period from the memory, supplies the latest data read from the memory to the input A of the subtraction means and supplies the data before the predetermined period read from the memory to the input B of the subtraction means.

4. A document reading apparatus according to claim 2, wherein the processing means comprises a memory, memory control means for controlling the memory, and a subtraction means having an input A and an input B for subtracting the input B from the input A, and the memory control means stores accumulated data corresponding to the specified pixel among the output of the converting means every predetermined period, reads the latest accumulated data and the accumulated data before the predetermined period from the memory, supplies the latest accumulated data read from the memory to the input A of the subtraction means and supplies the accumulated data before the predetermined period read from the memory to the input B of the subtraction means.

5. A document reading apparatus according to claim 1, wherein the converting means is a color image sensor for separating the received light into a first component, a second component, and a third component so as to output a first signal, a second signal, and a third signal corresponding to the first component, the second component, and the third component, respectively, and the processing means obtains the difference between latest data and data before the predetermined period corresponding to at least one of the first signal, the second signal, and the third signal.

6. A document reading apparatus comprising:

a reference member used for determining the reference gray scale of an image on an document;

a fluorescent lamp for illuminating the reference member;

a color image sensor for receiving light from the fluorescent lamp via the reference member and separating the received light into a first component, a second component, and a third component so as to output a first signal, a second signal, and a third signal corresponding to the first component, the second component, and the third component, respectively;

a processing means for obtaining the difference between data corresponding to one of the first signal, the second signal, and the third signal and data corresponding to another one of the first signal, the second signal, and the third signal; and determination means for determining whether or not the read operation of the document should be started by comparing the difference and a predetermined value.

\* \* \* \* \*